(12) United States Patent
Shimoda et al.

(10) Patent No.: US 6,442,115 B1
(45) Date of Patent: Aug. 27, 2002

(54) INFORMATION RECORDING APPARATUS

(75) Inventors: Yoshitaka Shimoda; Masayoshi Yoshida; Naoharu Yanagawa, all of Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/386,338

(22) Filed: Aug. 31, 1999

(30) Foreign Application Priority Data

Sep. 1, 1998 (JP) .......................................... P10-246970

(51) Int. Cl.$^7$ ................................................. G11B 7/00
(52) U.S. Cl. ................................ 369/47.28; 369/47.28; 369/59.1; 369/44.23
(58) Field of Search ............................ 369/47.1, 47.11, 369/47.15, 47.28, 47.36, 47.38, 47.4, 47.48, 47.5, 53.1, 53.11, 53.16, 53.25, 53.3, 59.1, 44.13, 275.1

(56) References Cited

U.S. PATENT DOCUMENTS

| | | | |
|---|---|---|---|
| 5,444,687 A | | 8/1995 | Okumura |
| 5,502,702 A | * | 3/1996 | Nakajo ...................... 369/53.22 |
| 6,201,784 B1 | * | 3/2001 | Maeda ................. 369/44.13 X |

FOREIGN PATENT DOCUMENTS

EP          0 414 557 A2     2/1991

\* cited by examiner

*Primary Examiner*—Muhammad Edun
(74) *Attorney, Agent, or Firm*—Finnegan, Henderson, Farabow, Garrett & Dunner, L.L.P.

(57) ABSTRACT

An information recording apparatus (S) records record information onto an optical disc (1), which corresponds to a CLV (Constant Linear Velocity) method to keep a linear velocity of the optical disc constant when reproducing the record information from the optical disc. The information recording apparatus is provided with: an optical pickup (14) having a laser (14a) for irradiating a light beam (B) from the laser onto a record track of the optical disc and for detecting a reflected light from the optical disc; a rotation controlling device (11, 17 to 20) for rotation-controlling the optical disc to keep a rotation angular velocity of the optical disc constant when recording the record information onto the optical disc; and a laser drive controlling device (11, 15, 16) for obtaining an optimum value of a laser driving amount for the optical pickup in correspondence with a linear velocity of the record track of the rotation-controlled optical disc with respect to the optical pickup and for drive-controlling the laser by use of the obtained optimum value of the laser driving amount.

6 Claims, 8 Drawing Sheets

INFORMATION RECORDING APPARATUS

BACKGROUND OF THE INVENTION

1. Field of the Invention

The present invention relates to an information recording apparatus, and more particularly relates to an information recording apparatus for recording record information with respect to an information record medium such as an optical disc of write-once type onto which the record information can be written just once, or an optical disc of re-writable type onto which the record information can be repeatedly written.

2. Description of the Related Art

A CLV (Constant Linear Velocity) method of recording information at a constant linear velocity is employed as a recording format for the above described optical disc such as a DVD. Thus, at a time of reproducing the optical disc, a rotation control of a spindle motor is performed so as to obtain a rotation angular velocity, which is proportional to the radius from the inner circumferential side to the outer circumferential side. The CLV method is superior in that it can improve the recording density since the minimum readable pit can be recorded from the inner circumferential side to the outer circumferential side. In case of recording the information onto an optical disc of write once type such as a DVD-R (DVD—Recordable), the control according to the CLV method is also performed. Namely, the spindle motor is rotation-controlled so as to make the linear velocity constant, and the writing operation is performed while the various conditions such as a laser power etc. are set to be constant at an arbitrary position on the optical disc. At this time, the writing speed of the data per unit time (i.e., the channel bit rate) is constant, and the channel bit clock which defines this channel bit rate has a constant frequency.

By the way, when various contents are recorded with respect to the optical disc such as a DVD-R, it may be necessary to once interrupt or stop the writing process and perform a search. Namely, there may happen a condition in which the non-recorded recordable areas are dispersed over the whole area of the optical disc. In such a condition, the search is performed by largely moving the radial position of the optical pickup on the optical disc and the writing process is resumed (hereinafter, one series of actions including the writing process, the interruption of the writing process, the search and the resumption of the writing process is called as a "recording sequence"). By this, the flexibility or versatility of the arrangement in recording the information on the optical disc is improved, so that it is possible to efficiently record the contents.

However, as mentioned above, since the optical disc such as a DVD etc., employs the CLV method, it becomes necessary to perform the search by changing the radial position and change the rotation angular velocity of the optical disc so as to harmonize it with the radial position of the search destination, in correspondence with the distribution of the non-recorded recordable areas. Thus, a certain time duration is required in order to control the spindle motor to stably drive it at the search destination, so that the speedily search may not be performed. As a result, the time duration required for the recording sequence with respect to the optical disc is increased. And that, as the non-recorded recordable areas are more severely dispersed over the whole area of the optical disc, this tendency of increasing the time duration required for the recording sequence becomes stronger, which is a problem.

SUMMARY OF THE INVENTION

The present invention is proposed in view of the above mentioned problems. It is therefore an object of the present invention to provide an information recording apparatus, which can perform a recording operation with respect to the optical disc by the CLV method while controlling the laser power appropriately and rotation-controlling the optical disc at a constant rotation angular velocity, to thereby perform a speedily searching operation even during the recording sequence.

The above object of the present invention can be achieved by an information recording apparatus for recording record information onto an optical disc, which corresponds to a CLV (Constant Linear Velocity) method to keep a linear velocity of the optical disc constant when reproducing the record information from the optical disc. The information recording apparatus is provided with: an optical pickup having a laser for irradiating a light beam from the laser onto a record track of the optical disc and for detecting a reflected light from the optical disc; a rotation controlling device for rotation-controlling the optical disc to keep a rotation angular velocity of the optical disc constant when recording the record information onto the optical disc; and a laser drive controlling device for obtaining an optimum value of a laser driving amount for the optical pickup in correspondence with a linear velocity of the record track of the rotation-controlled optical disc with respect to the optical pickup and for drive-controlling the laser by use of the obtained optimum value of the laser driving amount.

According to the present invention, in case of recording the record information with respect to the optical disc corresponding to the CLV method in the information recording apparatus, the optical disc is rotation-controlled at the constant rotation angular velocity, the light beam emitted from the laser of the optical pickup is irradiated onto the record track, and the linear velocity at this time is obtained. Then, the power control for the laser is performed by use of the optimum value of the laser driving amount which is obtained in correspondence with this obtained linear velocity. By this, even if the relative linear velocity at the time of writing is changed depending upon the radial position of the optical disc, since the laser can be driven with the laser driving amount in such a level that the laser can appropriately write the record information onto the optical disc. Thus, it is possible to drive the optical disc without changing the rotation angular velocity and to perform a speedy searching operation in the recording sequence.

In one aspect of the information recording apparatus of the present invention, a wobble signal is recorded on the optical disc by wobbling the record track at a constant frequency, and the laser drive controlling device obtains the optimum value of the laser driving amount on the basis of a frequency of the wobble signal which is extracted from a detection output of the optical pickup.

According to this aspect, the frequency of the wobble signal recorded on the optical disc is extracted from the detection output in correspondence with the linear velocity when rotation-controlling the optical disc corresponding to the CLV method at the constant rotation angular velocity. Then, the optimum value of the laser driving amount is obtained on the basis of this frequency, and the power control for the laser is performed. By this, it is possible to obtain quite precisely the relative linear velocity at the time of writing without complicating the structure, and it is also possible to drive the laser while precisely and optimally controlling it, to thereby realize the speedy search in the recording sequence.

In another aspect of the information recording apparatus of the present invention, a pre-pit to which control information is recorded in advance is formed on a guide track of the optical disc, the information recording apparatus is further provided with a pre-pit detecting device for detecting the pre-pit, and the laser drive controlling device obtains the optimum value of the laser driving amount on the basis of an appearance interval of the detected pre-pit.

According to this aspect, by detecting the pre-pit, which is formed in advance on the guide track of the optical disc, in correspondence with the linear velocity when rotation-controlling the optical disc corresponding to the CLV method at the constant rotation angular velocity, the appearance interval of the pre-pit exhibiting a constant regularity is obtained. Then, the optimum value of the laser driving amount is obtained on the basis of this appearance interval and the power control for the laser is performed. By this, it is possible to obtain quite precisely the relative linear velocity at the time of writing without complicating the structure, and it is also possible to drive the laser while precisely and optimally controlling it, to thereby realize the speedy search in the recording sequence.

In another aspect of the information recording apparatus of the present invention, the rotation controlling device rotation-controls the optical disc to keep the rotation angular velocity of the optical disc at a predetermined rotation angular velocity for each of a plurality of division areas into which a whole recordable area of the optical disc is divided in a radial direction thereof, and the predetermined rotation angular velocity is set for each of the division areas individually such that the predetermined rotation angular velocity is smaller as a radial position of respective one of the division areas goes farther from an inner circumference to an outer circumference of the optical disc.

According to this aspect, the whole recordable area of the optical disc corresponding to the CLV method is divided in the radial direction into the division areas. The rotation control is performed at the constant rotation angular velocity, which is predetermined for each of the divisions areas individually such that the predetermined rotation angular velocity is smaller as the radial position of respective one of the division areas goes farther to the outer circumference. Then, the optimum value of the laser driving amount is obtained for each of the division areas in correspondence with this obtained linear velocity and the power control for the laser is performed. By this, since the changing range of the linear velocity is narrowed within each of the division areas, the variable range of the laser power is also narrowed within each of the division areas. Accordingly, it is possible to perform the laser driving control with low cost and by use of a rather simple structure, and it is also possible to perform the speedy search within the same division area within which the search is frequently performed.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the attached drawings. In the following explanations, the present invention is applied to an information recording apparatus for recording record information onto a DVD-R (DVD-Recordable), as an information record medium of write-once type, which is capable of writing just once the record information.

Figure 1:
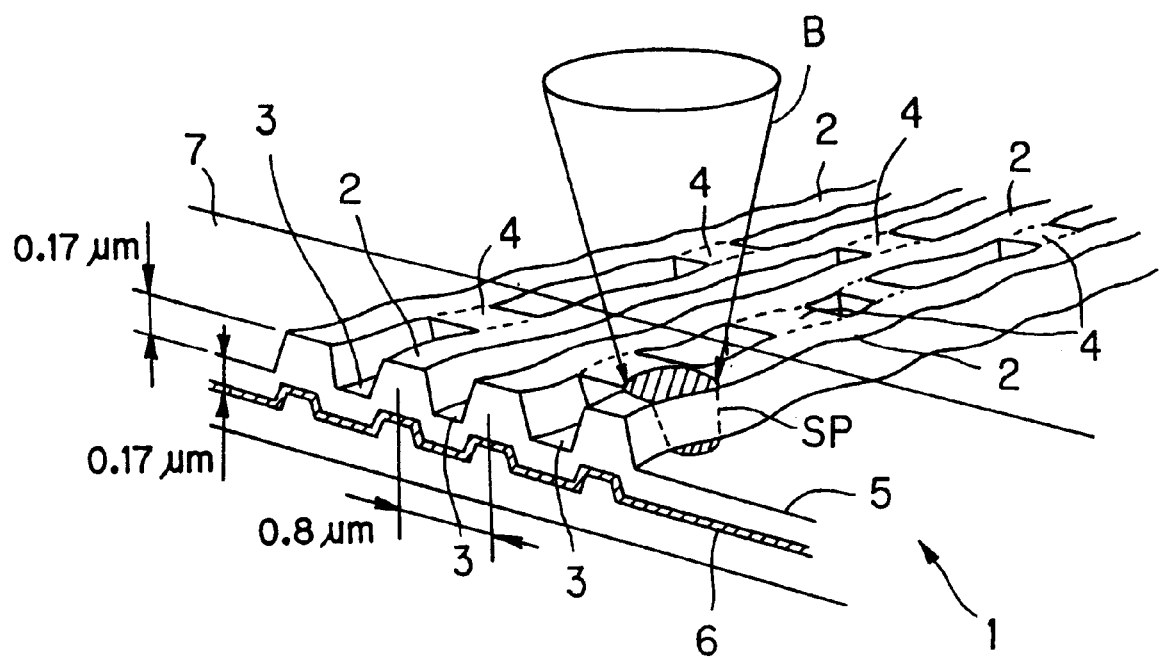
FIG. 1 is a perspective view showing a structure of a record layer of a DVD-R used in embodiments of the present invention.

FIG. 1 is a perspective view showing an example of the structure of the DVD-R used in embodiments of the present invention. As shown in FIG. 1, a DVD-R 1 has a pigment film 5 and is provided with a groove track 2 serving as one example of an information record track, to which the record information can be written only once, and a land track 3 serving as one example of a guide track, which guides a light beam B into the groove track 2. The land track 3 is adjacent to the groove track 2, and divides each turn of the groove track 2. Seeing from the irradiation side of the light beam B, the groove track 2 is in a convex shape, and the land track 3 is in a concave shape (in other words, seeing from the other side i.e., the side of the disc substrate, the groove track 2 is in a concave shape, and the land track 3 is in a convex shape). The DVD-R 1 is also provided with a protection film 7 for protecting the pigment film 5 and a gold deposition surface 6 for reflecting the light beam B when the recorded information is reproduced.

The groove track 2 is wobbled at a constant pitch in a direction parallel to a plane surface of the DVD-R 1 i.e., a so-called wobbling process is applied to the groove track 2. Then, in case of reproducing the groove track 2 by the CLV method, it is possible to extract a wobble signal, which has a constant wobble frequency corresponding to the constant pitch, from a push-pull signal obtained in the reproduction. This wobble signal can be used for obtaining a standard frequency to keep the linear velocity constant when rotation-driving the DVD-R 1 by the CLV method. In the present embodiment, this wobble signal is also used for judging the linear velocity of the DVD-R 1 on the basis of the wobble signal as described later.

A pre-pit 4 corresponding to pre-information of the DVD-R 1 for carrying various control information such as address information etc., of the DVD-R 1 is formed on the land track 3. This pre-pit 4 is formed in advance in a process of manufacturing the DVD-R 1. Since one portion of the beam spot formed on the DVD-R 1 by irradiating the light beam onto the groove track 2 is overlapped on the land track 3, the pre-pit 4 can be detected by the push-pull method using the reflection light by the method described later in detail, to thereby enable the extraction of the various control information therefrom.

Figure 2:
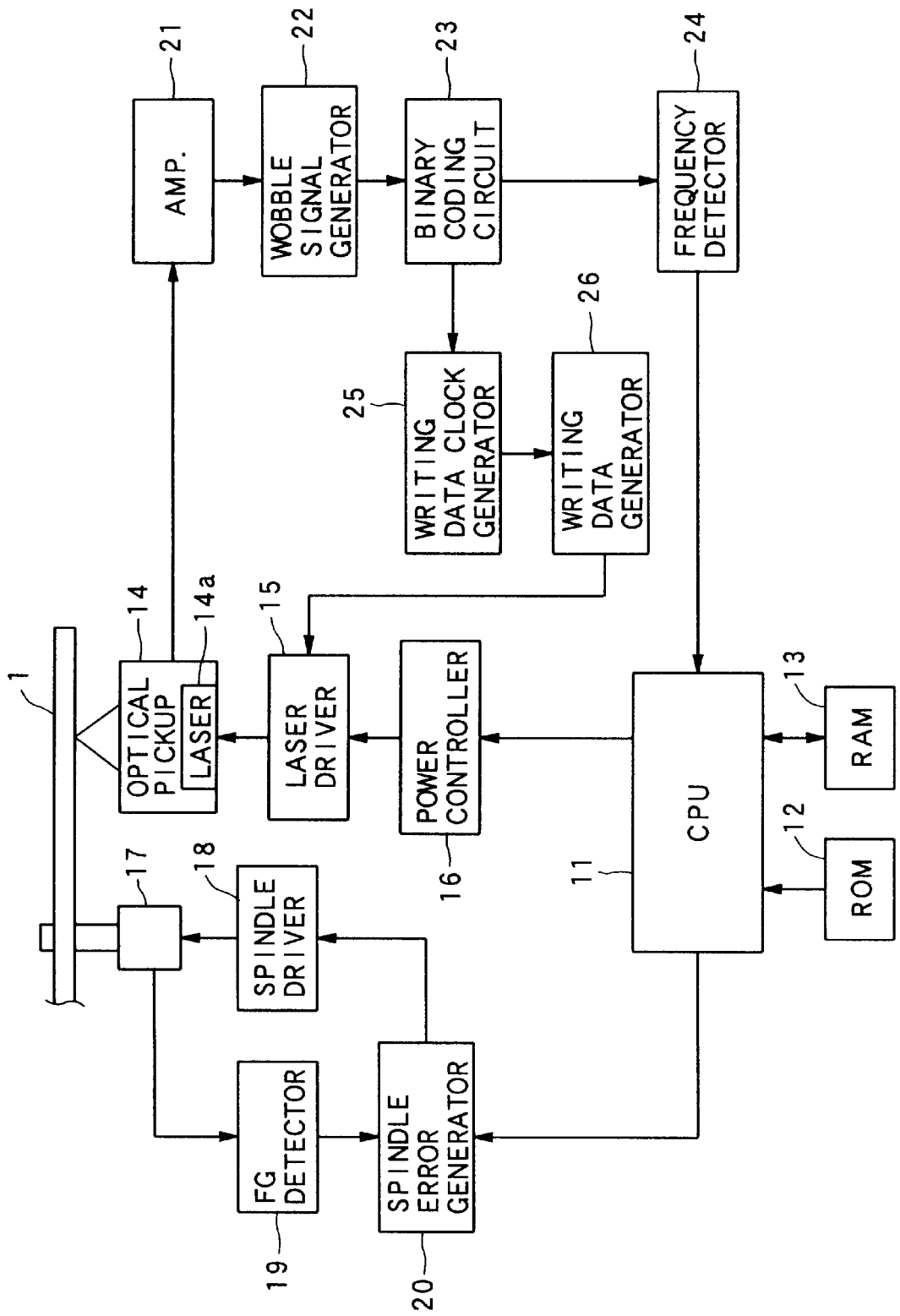
FIG. 2 is a block diagram showing a schematic configuration of an information recording apparatus as a first embodiment of the present invention.

FIG. 2 is a block diagram showing a schematic construction of an information recording apparatus as a first embodiment of the present invention. In FIG. 2, the information record apparatus is provided with a CPU 11, a ROM 12, a RAM 13, an optical pickup 14, a laser driving circuit 15, a power controller 16, a spindle motor 17, a spindle driver 18, an FG detector 19, a spindle error generator 20, an amplifier 21, a wobble signal generator 22, a binary coding circuit 23, a frequency detector 24, a writing data clock generator 25 and a writing data generator 26.

In FIG. 2, the CPU 11 controls the operation of the information recording apparatus on the whole, and are connected with each constitutional element. The ROM 12 stores various table data described later and a control program necessary for the process of the CPU 11. The RAM 13 temporarily stores data necessary for the process of the CPU 11 and the like.

The optical pickup 14 includes a semiconductor laser 14a for emitting the light beam, which is irradiated onto the information record surface of the DVD-R 1 as an information record medium, and a light detecting element for receiving the reflected light beam, converting it into an electric signal and outputting it as a light detection signal. The optical pickup 14 also includes optical elements such as a collimator lens, an objective lens, a polarization beam splitter, a multiple lens etc., as an optical system necessary for irradiating the light beam onto the DVD-R 1 and receiving the reflected light therefrom.

The laser driving circuit 15 is a circuit to supply a driving signal to the semiconductor laser 14a of the optical pickup 14. The power controller 16 generates a control signal corresponding to an output power of the semiconductor laser 14a and output it to the laser driving circuit 15 in order to appropriately control the driving signal, which is supplied from the laser driving circuit 15 under the control of the CPU 11. Namely, it is a circuit to set a voltage value of the driving signal corresponding to the recording power, by which the light amount of the light beam emitted from the semiconductor laser 14a at the time of writing becomes the optimum. The present embodiment is constructed such that the voltage value of the driving signal of the semiconductor laser 14a is varied appropriately in correspondence with the linear velocity when writing the information onto the DVD-R 1 by conducting the process described later.

The spindle motor 17 rotation-drives the DVD-R 1 by a rotation driving signal which is supplied from the spindle driver 18. The FG detector 19 is also connected to the spindle motor 17 such that a pulse, which has a frequency proportional to the rotation number of the spindle motor 17 (hereinafter, it is called as "rotation pulse"), is outputted therefrom. By using this rotation pulse, it is possible to judge the rotation number of the spindle motor 17. The spindle error generator 20 receives this rotation pulse from the FG detector 19 while a standard rotation number set in advance is instructed to the spindle error generator 20 from the CPU 11. Then, the spindle error generator 20 generates an error signal by comparing the rotation number of the spindle motor 17 with the standard rotation number. This error signal is fed back to the spindle driver 18 and the rotation control is performed so that those rotation numbers are coincident to each other. In this manner, the rotation number of the spindle motor 17 can be kept in stable to be at the standard rotation number.

In the present embodiment, the rotation driving for the DVD-R 1 is conducted so as to obtain a constant angular velocity in correspondence with the standard rotation number from the inner circumference to the outer circumference of the disc. By this, as compared with the recording operation in which the linear velocity is set constant for the DVD-R 1, the present embodiment is advantageous in performing the speedy search accompanied with the movement of the optical pickup 14 between the different disc radial positions in the recording sequence, and it is possible to perform the rotation driving by means of a simpler control. On the other hand, in case of reproducing the DVD-R 1 which is recorded in this manner, it is desirable to read out the information by the CLV method which is advantageous in the memory capacity. Thus, the recording process is performed in line with the CLV method as the disc format. Therefore, it is coped with by appropriately adjusting the voltage value of the driving signal of the semiconductor laser 14a in the power controller 16, which will be described later in detail.

On the other hand, the push-pull signal outputted from the optical pickup 14 is amplified by the amplifier 21, and is inputted to the wobble signal generator 22. In this wobble signal generator 22, unnecessary components are removed from the amplified push-pull signal by using a band pass filter etc., so as to extract the aforementioned wobble signal.

At this time, as mentioned above, the wobbling process with respect to the groove track 2 is performed by wobbling the groove track 2 at the constant pitch. Since the rotation control for the DVD-R 1 is performed so as to keep the rotation angular velocity constant in the present embodiment, the extracted wobble signal becomes a signal which has a wobble frequency varying in correspondence with the linear velocity. Therefore, in the first embodiment, by detecting the wobble frequency on the basis of the extracted wobble signal, the linear velocity of the DVD-R 1 is judged in the reverse manner, and the output power of the semiconductor laser 14a is controlled by this.

In order to cope with the disc corresponding to the CLV method, the channel bit rate of the record data is changed in proportional to the linear velocity. Here, the channel bit is changed by synchronizing the channel bit clock to define the channel bit rate with the wobble frequency.

At first, since the wobble signal obtained by the wobble signal generator 22 is an analog signal according to the wobbling pattern, the wobble signal is binary coded by the binary coding circuit 23. Namely, the binary coding circuit 23 performs the binary coding process with slicing the wobble signal at a constant level so as to restrict the change in the amplification of the wobble signal, and outputs the binary coded wobble signal as a digital pulse, which has a frequency corresponding to the rotation angular velocity.

Next, the frequency detector 24 detects the wobble frequency on the basis of the binary coded wobble signal outputted from the binary coding circuit 23. In the frequency detector 24, it is possible to employ various methods to actually detect the wobble frequency. For example, the binary coded wobble signal may be inputted to a frequency counter to be converted into a count value corresponding to the wobble frequency. The count value obtained by the frequency detector 24 is outputted to the CPU 11 and is temporarily stored in the RAM 13. Incidentally, the binary coded wobble signal may be inputted directly to the CPU 11, and the wobble frequency may be judged by the CPU 11.

In place of measuring the wobble frequency in the above mentioned manner, the cycle (i.e., the period) of the wobble signal may be measured. Namely, since the frequency of the wobble signal is the inverse number of the cycle of the wobble signal, either can be obtained as the equivalent parameter, which corresponds to the linear velocity of the DVD-R 1 as it is.

On the other hand, the writing data clock generator 25 extract a writing data clock corresponding to the above mentioned channel bit rate on the basis of the binary coded wobble signal outputted from the binary coding circuit 23. Then, the writing data generator 26 outputs the actual writing data to the laser driving circuit 15 in synchronization with the extracted writing data clock.

The CPU 11 judges the linear velocity corresponding to the disc radial position of the DVD-R 1 on the basis of the above mentioned count value stored in the RAM 13, and instructs the optimum recording power of the semiconductor laser 14a to the power controller 16. For example, the disc radial position of the DVD-R 1 and the recording power of the semiconductor laser 14a may be changed in accordance with a following expression (1).

$$P(r) = (r/r_{min})^{1/2} \times P_{min} \qquad (1)$$

wherein r: disc radial position (mm)

$r_{min}$: disc innermost circumference radial position (mm)

$P_{min}$: optimum recording power at the disc innermost circumference (mW)

P(r): optimum recording power at the disc radius r (mW)

Figure 3:
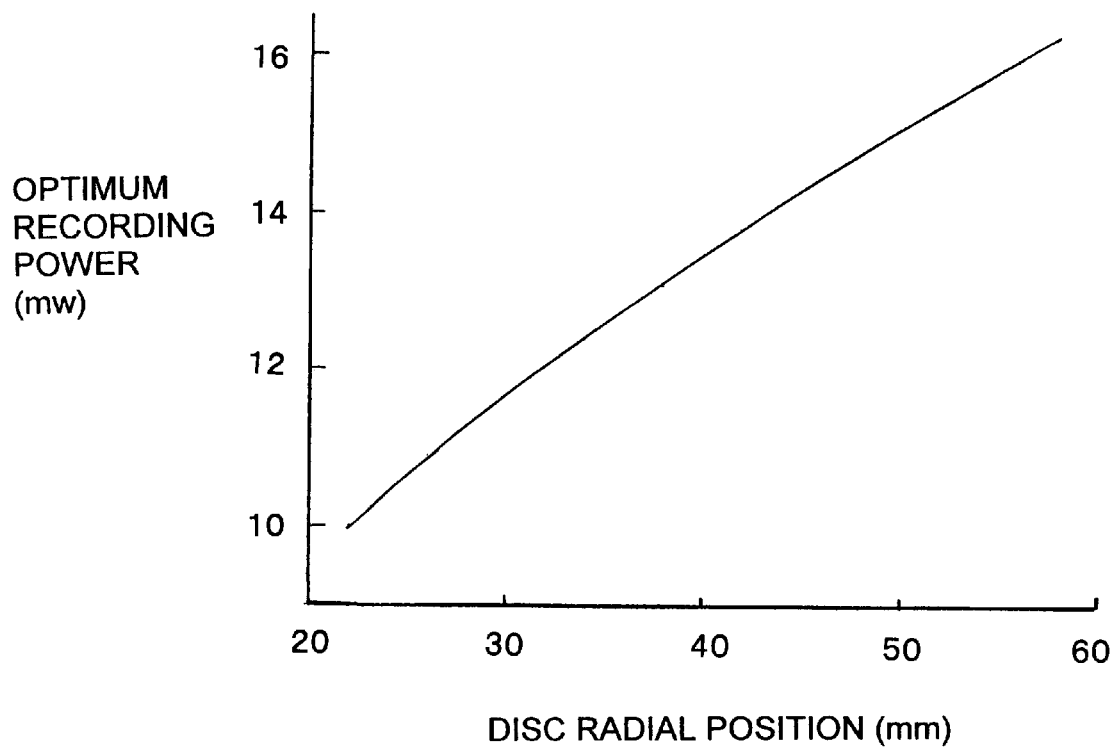
FIG. 3 is a graph showing a calculation result of an optimum recording power versus a disc radial position in the information recording apparatus of the first embodiment.

FIG. 3 shows a result of calculating the optimum recording power P(r) according to the expression (1) assuming that $r_{min}$=22 (mm) and $P_{min}$=10 (mW). In this calculation, the linear velocity at the disc innermost circumference is set to 3.49 (m/s), and the radial position at the disc outermost circumference is set to 58 (mm). The rotation angular velocity at this time is about 1500 (rpm).

As shown in FIG. 3, the optimum recording power P(r) is in a range of 10 to 16.2 (mW) with respect to the disc radial position r in a range of 22 to 58 (mm). The optimum recording power P(r) increases as the disc radial position r increases. In this manner, the laser driving circuit 15 and the semiconductor laser 14a are required to realize the power variable range of 10 to 16.2 (mW) in this example.

In the present embodiment, the CPU 11 reads the count value stored in the RAM 13, and obtains the optimum recording power P(r) as indicated by the expression (1). Namely, the linear velocity of the DVD-R 1 and the disc radial position are in one-to-one correspondence, so that the linear velocity of the DVD-R 1 can be directly obtained from the above mentioned count value. Accordingly, it is possible to calculate the optimum recording power P(r) as a result. Incidentally, the calculation of the optimum recording power P(r) may be obtained by the calculation of the expression (1) or may be read out from a table set in advance, in which the above mentioned count value and the optimum record power are corresponded to each other, in the ROM 12.

The calculation of the optimum record power P(r) may be linked with the power calibration process of the DVD-R 1 (i.e., the OPC process). Namely, in the power calibration area prepared in the inner circumference side of the DVD-R 1, the trial writing process is performed by the semiconductor laser 14a under a specific condition so as to judge the power. Therefore, when calculating the optimum recording power P(r), the OPC process may be additionally performed at the innermost circumference and the outermost circumference, so that the above mentioned table may be formed with reflecting the result of this OPC process. Alternatively, the correction of the optimum recording power P(r), which has been calculated in the above mentioned manner, may be performed.

In this manner, by controlling the recording power in correspondence with the linear velocity of the DVD-R 1, the heat amount applied by the laser beam irradiated onto the information record surface at the time of writing the DVD-R 1 can be kept constant. Namely, in case of controlling the semiconductor laser 14a at a constant recording power, the heat amount applied per unit length is increased at the inner circumferential portion of the DVD-R 1 since the linear velocity is decreased there while the heat amount applied per unit length is decreased at the outer circumferential portion of the DVD-R 1 since the linear velocity is increased there. This is because the DVD-R 1 is recorded by the CLV method so that the record information amount per unit length is substantially constant, and the DVD-R 1 is driven at the constant rotation angular velocity in the present embodiment. Therefore, by optimally controlling the recording power P(r) of the semiconductor laser 14a along with the change of the linear velocity of the DVD-R 1 in the above mentioned manner, it is possible to write the information onto the DVD-R 1 with the constant heat amount.

Figure 4:
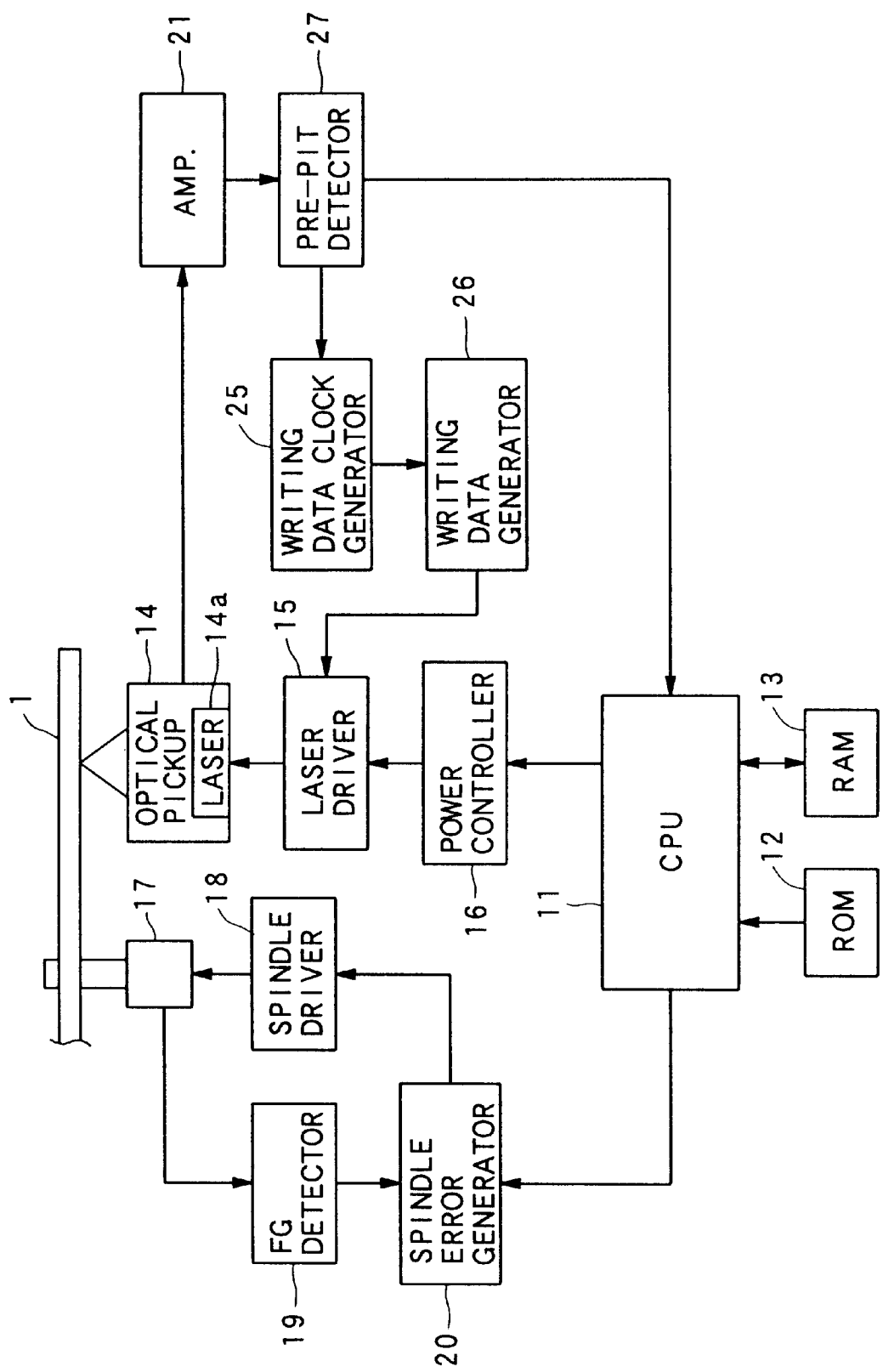
FIG. 4 is a block diagram showing a schematic configuration of an information recording apparatus as a second embodiment of the present invention.

Next, FIG. 4 is a block diagram showing a schematic construction of an information recording apparatus as a second embodiment of the present invention. In FIG. 4, the information record apparatus is provided with the CPU 11, the ROM 12, the RAM 13, the optical pickup 14, the laser driving circuit 15, the power controller 16, the spindle motor 17, the spindle driver 18, the FG detector 19, the spindle error generator 20, the amplifier 21, the writing data clock generator 25, the writing data generator 26 and a pre-pit detector 27.

In FIG. 4, the constitutional elements other than the pre-pit detector 27 are the same as those of the above described first embodiment and the explanations thereof are omitted.

The push-pull signal, which is outputted from the optical pickup 14 and is amplified by the amplifier 21, is inputted to the pre-pit detector 27 serving as one example of a pre-pit detecting device. Then, the pre-pit detector 27 detects the pre-pit 4 which is formed on the land track 3 in advance.

Figure 5:
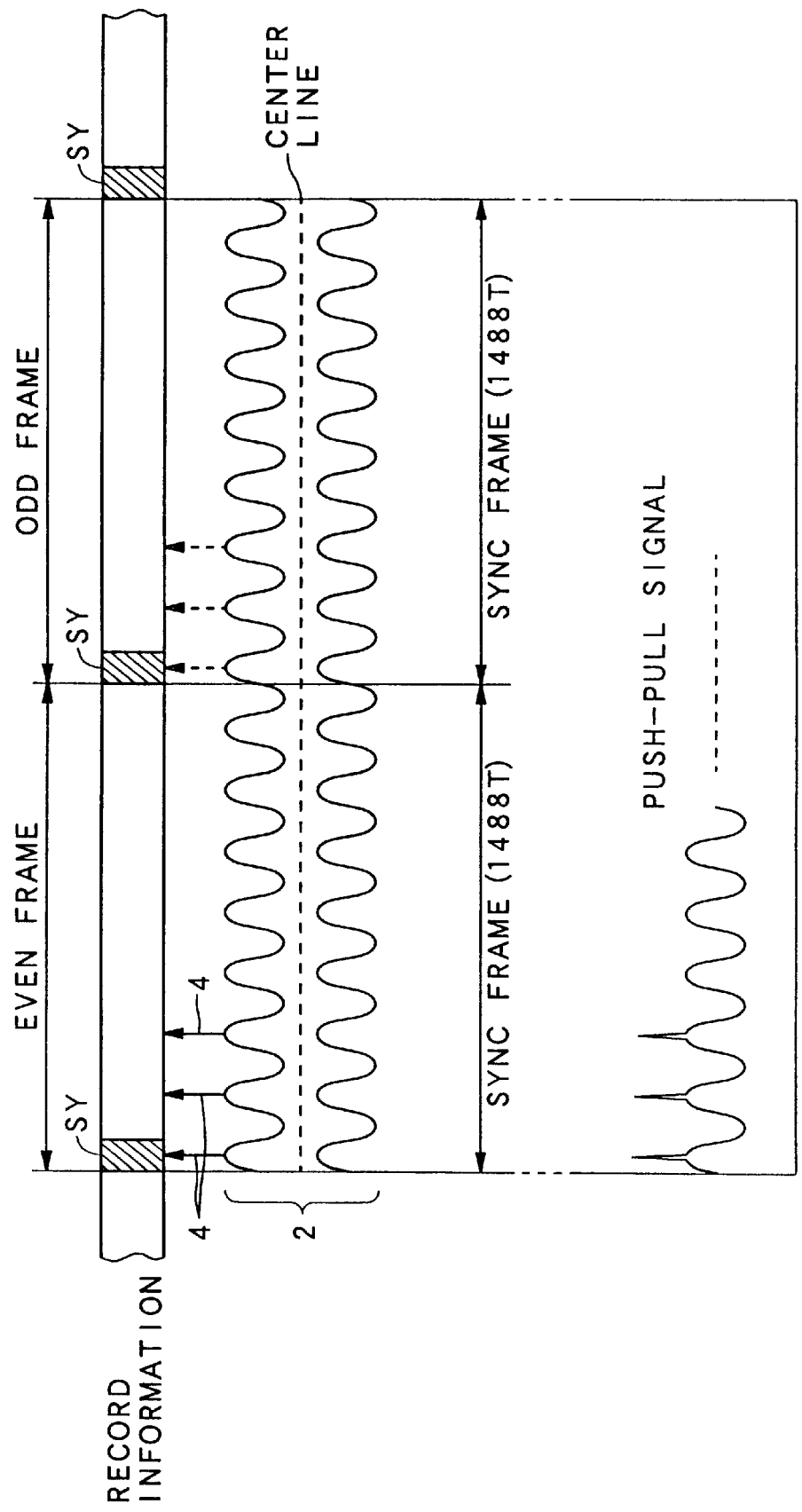
FIG. 5 is a diagram showing a recording format of a pre-pit in the DVD-R of the second embodiment.

Here, the record format of the pre-pit 4 on the DVD-R 1 in this embodiment will be described below with reference to FIG. 5. In FIG. 5, a condition in which the record information recorded on the DVD-R 1 is divided by the unit of synchronization (SYNC) frame is shown, and a condition in which the groove track 2 is wobbled by a sine wave is shown below it. Further, the lower stage of FIG. 5 shows a wave form pattern of a push-pull signal, which is varied in correspondence with the wobbling and the pre-pit 4.

The synchronization frame in FIG. 5 has a length equal to 1488T times (1488T) of the unit length (hereafter, referred to as T) corresponding to a pit interval prescribed by the record format when the record information is recorded. A synchronization information SY necessary for the synchronization for each synchronization frame is recorded on a portion of a length corresponding to a lead 14T of one synchronization frame. One recording sector is composed of 26 synchronization frames, and one ECC (Error Correcting Code) block is composed of 16 recording sectors.

In FIG. 5, the pre-pit 4 is formed in advance at the position corresponding to each upper-directed arrow in the solid line. Namely, in FIG. 5, the pre-pit 4 is formed on the land track 3 adjacent to the position, which corresponds to either one of the mountain and the valley of the wave form corresponding to the wobbling of the groove track 2 and which is at most $3^{rd}$ position counted from the lead of each synchronization frame. In one recording sector, the pre-pit 4 is formed with respect to only the synchronization frame in the even number (i.e., the EVEN frame) or only the synchronization frame in the odd number (i.e., the ODD frame). In FIG. 5, a case is shown in which the pre-pit 4 is formed with respect to only the EVEN frame and the pre-pit 4 is not formed at the position corresponding to each upper-directed arrow in dot line. The pre-pit 4 disposed at the position closest to the lead of the synchronization frame is provided for the synchronization, and is disposed in correspondence with the predetermined even or odd frame. This pre-pit for the synchronization is to carry the address information which is identified by the unit of recording sector on the information record surface of the DVD-R 1.

Accordingly, the pre-pit 4 is usually formed in the EVEN frame and the pre-pit 4 is hardly formed in the ODD frame with respect to the DVD-R 1. Thus, since the appearance interval of the pre-pit 4 which is detected by the pre-pit detector 27 is constant mostly in the whole range where the DVD-R 1 is rotation-driven, the linear velocity of the DVD-R 1 can be accurately judged in the same manner as the above mentioned wobble signal. Therefore, the second embodiment is constructed such that the pre-pit 4 is detected by the pre-pit detector 27 on the basis of the push-pull signal at the lower stage of FIG. 5, and the output power of the semiconductor laser 14a is controlled on the basis of the appearance interval of the pre-pit 4.

Figure 6:
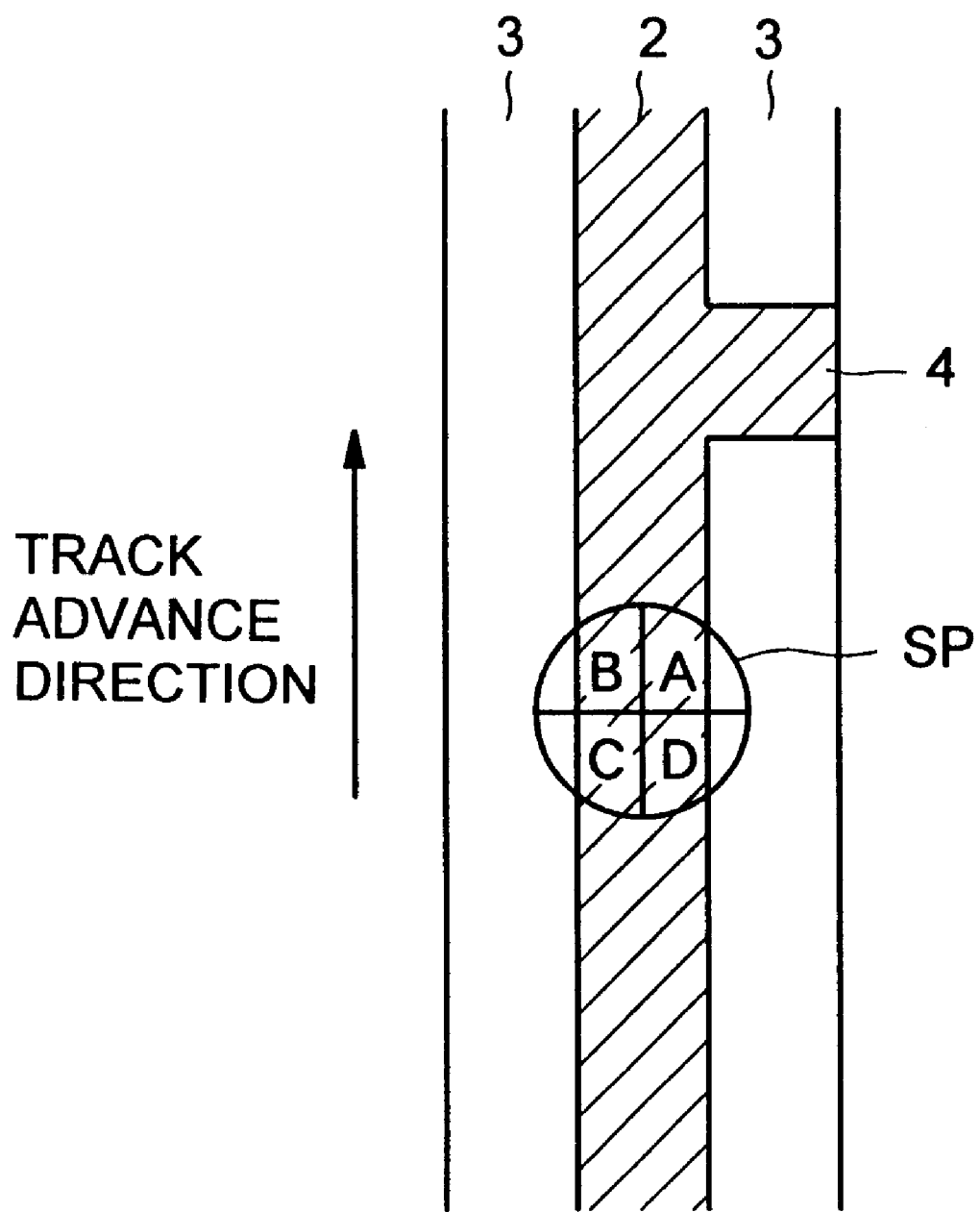
FIG. 6 is a diagram showing a principle of detecting the pre-pit in the second embodiment.

FIG. 6 is a diagram for explaining one example of the detection principle of the pre-pit 4 formed on the DVD-R 1 in the second embodiment. As shown in FIG. 6, the above described groove track 2 and the land track 3 are alternatively formed on the DVD-R 1, and the pre-pit 4 is formed on the land track 3. A beam spot SP is formed from the light beam while the light beam is advanced in a direction of an arrow in FIG. 6 by irradiating the light beam onto the groove track 2 of the DVD-R 1, and such a condition is obtained that one portion of the beam spot SP is overlapped on the land track 3.

The reflection light from the beam spot SP is received by the light receiving element of the optical pickup 14. At this time, in case of using the light receiving element in a 4 divided shape for example, the reflection light from the beam spot SP is divided in correspondence with the areas A, B, C and D as shown in FIG. 6, so that light detection signals $S_A$, $S_B$, $S_C$ and $S_D$ corresponding to the light receiving outputs in the respective divided areas A, B, C and D are outputted. Then, the detection of the pre-pit 4 can be performed by using the push-pull method for example in the pre-pit detector 27. Thus, a signal sum of $(S_A+S_D)-(S_B+S_C)$ is obtained for example, as a signal which changes along with the wobbling and the appearance of the pre-pit 4 (as shown in FIG. 5). At this time, as the judging process is performed with respect to the detection signal with setting an appropriate threshold, the pre-pit 4 can be detected. Further, the wobble signal can be obtained as the push-pull signal passes through an appropriate band pass filter.

On the other hand, the detection signal obtained by correlating the detection of the respective pre-pit 4 with a pulse respectively is outputted from the pre-pit detector 27 to the CPU 11. The CPU 11 counts the interval of the pulse of this detection signal, and the count value is stored into the RAM 13, so that the appearance interval of the pre-pit 4 can be judged. This count value is read out by the CPU 11 from the RAM 13, the linear velocity corresponding to the disc radial position of the DVD-R 1 is judged by the CPU 11, and the optimum recording power of the semiconductor 14a is instructed by the CPU 11 with respect to the power controller 16 as mentioned above. The control of the optimum recording power of the semiconductor laser 14a by the CPU 11 may be performed in the same manner as the first embodiment, and the calculation process indicated by the expression (1) may be employed as it is.

In case of a condition where the pre-pit 4 is formed in the EVEN frame is transited to a condition where the pre-pit 4 is formed in the ODD frame, the appearance interval of the pre-pit 4 in the ODD frame after that is detected. Then, when the EVE frame is switched to the ODD frame, or when the ODD frame is switched to the EVEN frame, since the appearance interval of the pre-pit 4 is added with one frame amount in surplus, one frame amount is subtracted from the above mentioned count value of the CPU 11. Further, the channel bit clock is synchronized with the detected pre-pit 4 in the same manner as the first embodiment.

Next, a modified embodiment of the first or second embodiment of the present invention is explained. In the above described embodiments, the rotation driving process is performed at the constant rotation angular velocity in all areas of the DVD-R 1. In contrast, a case as the modified embodiment is explained in which the whole recordable area of the DVD-R 1 is divided into a plurality of areas corresponding to the disc radial position, and the rotation driving process is performed at the rotation angular velocity set for respective divided areas.

Figure 7:
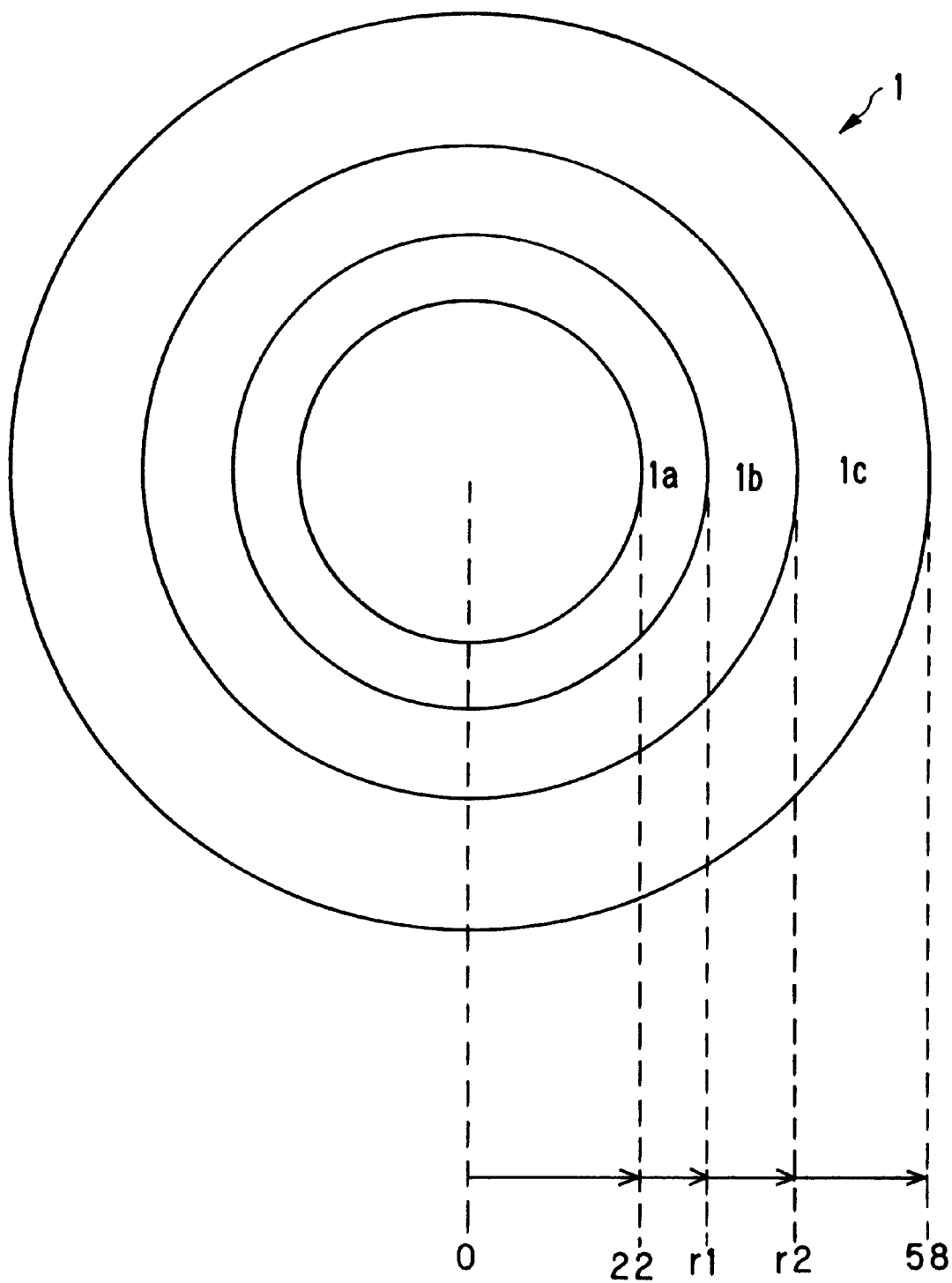
FIG. 7 is a diagram showing one example of area divisions with respect to the DVD-R in a modified embodiment of the present invention.

FIG. 7 is a diagram explaining one example of the area division for the DVD-R 1 in the modified embodiment. Here, a case in which the area from the inner circumference to the outer circumference of the DVD-R 1 is divided into 3 areas is explained.

As shown in FIG. 7, the DVD-R 1 is divided into an area 1a at the innermost circumference side, an area 1b at an intermediate portion and an area 1c at the outermost circumference side in correspondence with the disc radial position. As described above, the disc innermost circumference portion is at the radius position 22 (mm) and the disc outermost circumference portion is at the radius position 58 (mm). The boundary between the area 1a and the area 1b is expressed by a radial position r1, and the boundary between the area 1b and the area 1c is expressed by a radial position r2.

At this time, the radial positions r1 and r2 are determined as substantially satisfying a following expression (2).

$$r1/22 = r2/r1 = 58/r2 \tag{2}$$

By calculating the expression (2), it is obtained that r1=30 (mm) and r2=42 (mm).

Then, the optimum recording power P(r) of the semiconductor laser 14a at the disc radial position of the DVD-R 1 becomes as following expressions (3) to (5), in correspondence with the expression (1).

Firstly, the optimum recording power P(r) in the area 1a is controlled according to the expression (3).

$$P(r) = (r/22)^{1/2} \times P_{min} \tag{3}$$

The optimum recording power P(r) in the area 1b is controlled according to the expression (4).

$$P(r) = (r/\ r1)^{1/2} \times P_{min} \tag{4}$$

The optimum recording power P(r) in the area 1c is controlled according to the expression (5).

$$P(r) = (r/r2)^{1/2} \times P_{min} \tag{5}$$

The meanings of r, $P_{min}$, and P(r) are the same as those in the expression (1).

In each of the areas 1a, 1b and 1c, the linear velocity is set to 3.84 (m/s) at the radial position corresponding to the outermost circumference portion thereof. Then, the corresponding rotation angular velocity is about 1222 (rpm) in the area 1a, about 873 (rpm) in the area 1b and about 632 (rpm) in the area 1c. Namely, the rotation angular velocity is decreased as the radial position is shifted from the inner circumference to the outer circumference of the DVD-R 1. Those rotation angular velocities can be switched over as the CPU 11 instructs the spindle error generator 20.

Figure 8:
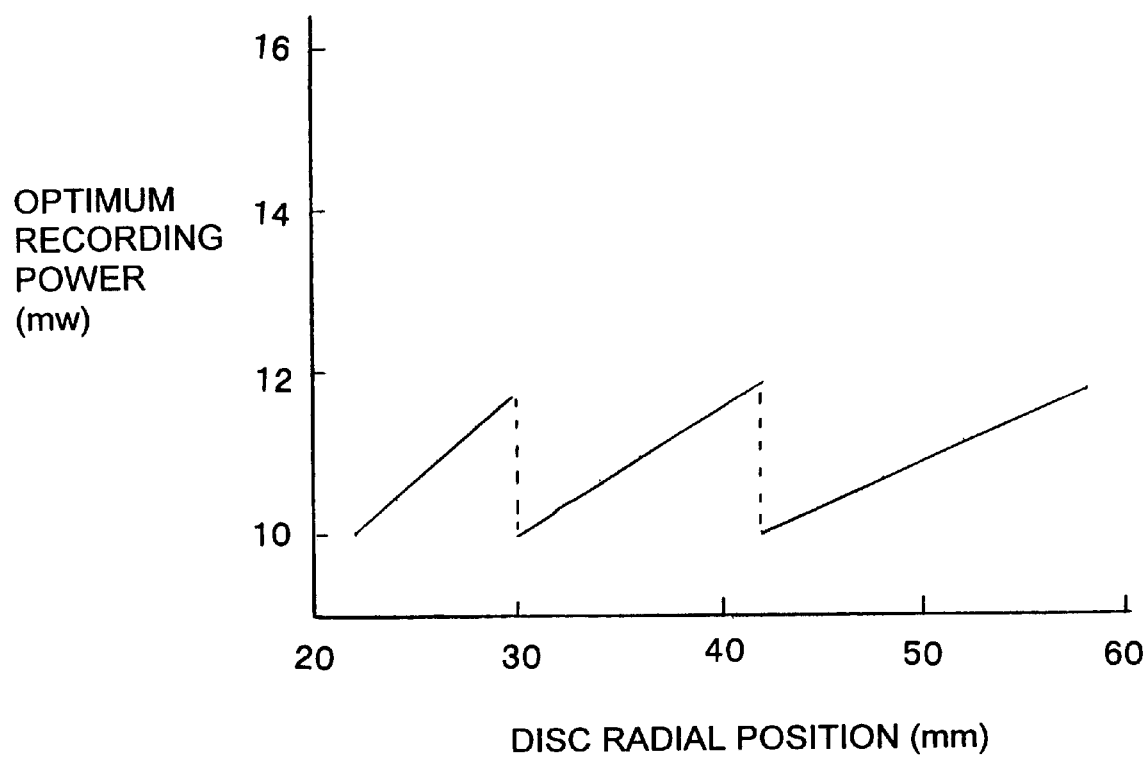
FIG. 8 is a graph showing a calculation result of an optimum recording power versus a disc radial position in the information recording apparatus of the modified embodiment.

FIG. 8 shows a result of calculating the optimum recording power P(r) according to the expressions (3) to (5). In each of the expressions (3) to (5), the optimum recording power at the innermost circumference portion $P_{min}$ is assumed to be 10 (mW). As shown in FIG. 8, the optimum recording power P(r) in the area 1a is in a range of 10 to 11.3 (mW), the optimum recording power P(r) in the area 1b is in a range of 10 to 11.8 (mW), and the optimum recording power P(r) in the area 1c is in a range of 10 to 11.7 (mW).

Therefore, as compared with the case of FIG. 3 in which the area of the DVD-R 1 is not divided, the changing range of the optimum recording power P(r) is smaller in the case in which the whole area is divided into 3 areas as in the present modified embodiment. By this, it is enough to perform the control of the output power of the semiconductor laser 14a by the power controller 16 in a smaller range, so that it is possible to employ the semiconductor laser 14a, which has the smaller power variable range, and it is also possible to drive the laser driving circuit 15 in the narrower range. Therefore, the information recording apparatus of the present modified embodiment can be simplified in its structure, and the cost can be reduced.

On the other hand, in the structure in which the area of the DVD-R 1 is divided, although the rotation-control is performed at the constant rotation angular velocity in the same area, the rotation angular velocities in the different areas 1a, 1b and 1c are different from each other. Thus, in case of searching across the areas 1a, 1b and 1c in the recording sequence, it becomes necessary to adjust the rotation angular velocity. Accordingly, in case of searching across the plurality of areas, the time duration is required for the adjustment of the rotation angular velocity. However, as the radial position of the DVD-R 1 is the closer, the frequency of the searching operation is the higher in fact. Thus, the frequency of the searching operation across the plurality of areas is relatively low. Consequently, even in case of dividing the whole area of the DVD-R 1 as in the present modified embodiment, the drawback of the increase of the time duration required for the searching operation is rather negligible Incidentally, the boundary of the area divisions with respect to the DVD-R 1 in the present modified embodiment can be correlated with the aforementioned ECC blocks. Namely, a linking area is prepared as an area to newly start postscript-writing in the lead portion of the ECC block. In this linking area, the recording process of the preceding ECC block is finished, the postscript-writing of the subsequent ECC block is started, and the recording operation is performed with overlapping the preceding one. Therefore, by performing the area division with this linking area as the cut line, the recording operation can be smoothly continued even in case that the transition to a different division area in the recording sequence occurs.

In the above explained modified embodiment, although the case in which the area of the DVD-R 1 is divided into 3 areas has been explained, the present invention is not limited to this. Instead, the number of the divided areas may be increased. As the number of the divided areas is increased, although the control becomes more complicated, it is possible to narrow the power variable range of the semiconductor laser 14a.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-246970 filed on Sep. $1^{st}$, 1998 including the specification, claims, drawings and summary is incorporated herein by reference in its entirety.

What is claimed is:

1. An information recording apparatus for recording record information onto an optical disc, which corresponds to a CLV (Constant Linear Velocity) method to keep a linear velocity of the optical disc constant when reproducing the record information from the optical disc, said apparatus comprising:

an optical pickup having a laser for irradiating a light beam from said laser onto a record track of the optical disc and for detecting a reflected light from the optical disc;

a rotation controlling device for rotation-controlling the optical disc to keep a rotation angular velocity of the optical disc constant when recording the record information onto the optical disc; and a laser drive controlling device for obtaining an optimum value of a laser driving amount for said optical pickup in correspondence with a linear velocity of the record track of the rotation-controlled optical disc with respect to said optical pickup and for drive-controlling said laser by use of the obtained optimum value of the laser driving amount, wherein a wobble signal is recorded on the optical disc by wobbling the record track at a constant frequency, and said laser drive controlling device obtains the optimum value of the laser driving amount on the basis of a frequency of the wobble signal which is extracted from a detection output of said optical pickup.

2. An apparatus according to claim 1, wherein said rotation controlling device rotation-controls the optical disc to keep the rotation angular velocity of the optical disc at a predetermined rotation angular velocity for each of a plurality of division areas into which a whole recordable area of the optical disc is divided in a radial direction thereof, and the predetermined rotation angular velocity is set for each of the division areas individually such that the predetermined rotation angular velocity is smaller as a radial position of respective one of the division areas goes farther from an inner circumference to an outer circumference of the optical disc.

3. An apparatus according to claim 1, wherein said rotation controlling device rotation-controls the optical disc to keep the rotation angular velocity of the optical disc at a predetermined rotation angular velocity for each of a plurality of division areas into which a whole recordable area of the optical disc is divided in a radial direction thereof, and an boundary of the division areas is correlated with an ECC Block.

4. An information recording apparatus for recording record information onto an optical disc, which corresponds to a CLV (Constant Linear Velocity) method to keep a linear velocity of the optical disc constant when reproducing the record information from the optical disc, said apparatus comprising:

an optical pickup having a laser for irradiating a light beam from said laser onto a record track of the optical disc and for detecting a reflected light from the optical disc;

a rotation controlling device for rotation-controlling the optical disc to keep a rotation angular velocity of the optical disc constant when recording the record information onto the optical disc; and a laser drive controlling device for obtaining an optimum value of a laser driving amount for said optical pickup in correspondence with a linear velocity of the record track of the rotation-controlled optical disc with respect to said optical pickup and for drive-controlling said laser by use of the obtained optimum value of the laser driving amount, wherein a pre-pit to which control information is recorded in advance is formed on a guide track of the optical disc, said apparatus further comprises a pre-pit detecting device for detecting the pre-pit, and said laser drive controlling device obtains the optimum value of the laser driving amount on the basis of an appearance interval of the detected pre-pit.

5. An apparatus according to claim 4, wherein said rotation controlling device rotation-controls the optical disc to keep the rotation angular velocity of the optical disc at a predetermined rotation angular velocity for each of a plurality of division areas into which a whole recordable area of the optical disc is divided in a radial direction thereof, and the predetermined rotation angular velocity is set for each of the division areas individually such that the predetermined rotation angular velocity is smaller as a radial position of respective one of the division areas goes farther from an inner circumference to an outer circumference of the optical disc.

6. An apparatus according to claim 4, wherein said rotation controlling device rotation-controls the optical disc to keep the rotation angular velocity of the optical disc at a predetermined rotation angular velocity for each of a plurality of division areas into which a whole recordable area of the optical disc is divided in a radial direction thereof, and an boundary of the division areas is correlated with an ECC Block.

\* \* \* \* \*

UNITED STATES PATENT AND TRADEMARK OFFICE
CERTIFICATE OF CORRECTION

PATENT NO. : 6,442,115 B1
DATED : August 27, 2002
INVENTOR(S) : Yoshitaka Shimoda It is certified that error appears in the above-identified patent and that said Letters Patent is hereby corrected as shown below:

<u>Column 12,</u>
Line 66, "an boundary" should read -- a boundary --.

<u>Column 14,</u>
Line 24, "an boundary" should read -- a boundary --.

Signed and Sealed this

Fifteenth Day of October, 2002

*Attest:*

*Attesting Officer*

JAMES E. ROGAN
*Director of the United States Patent and Trademark Office*